M. DEACON & W. GORE.
FILTERING APPARATUS.
APPLICATION FILED DEC. 3, 1912.

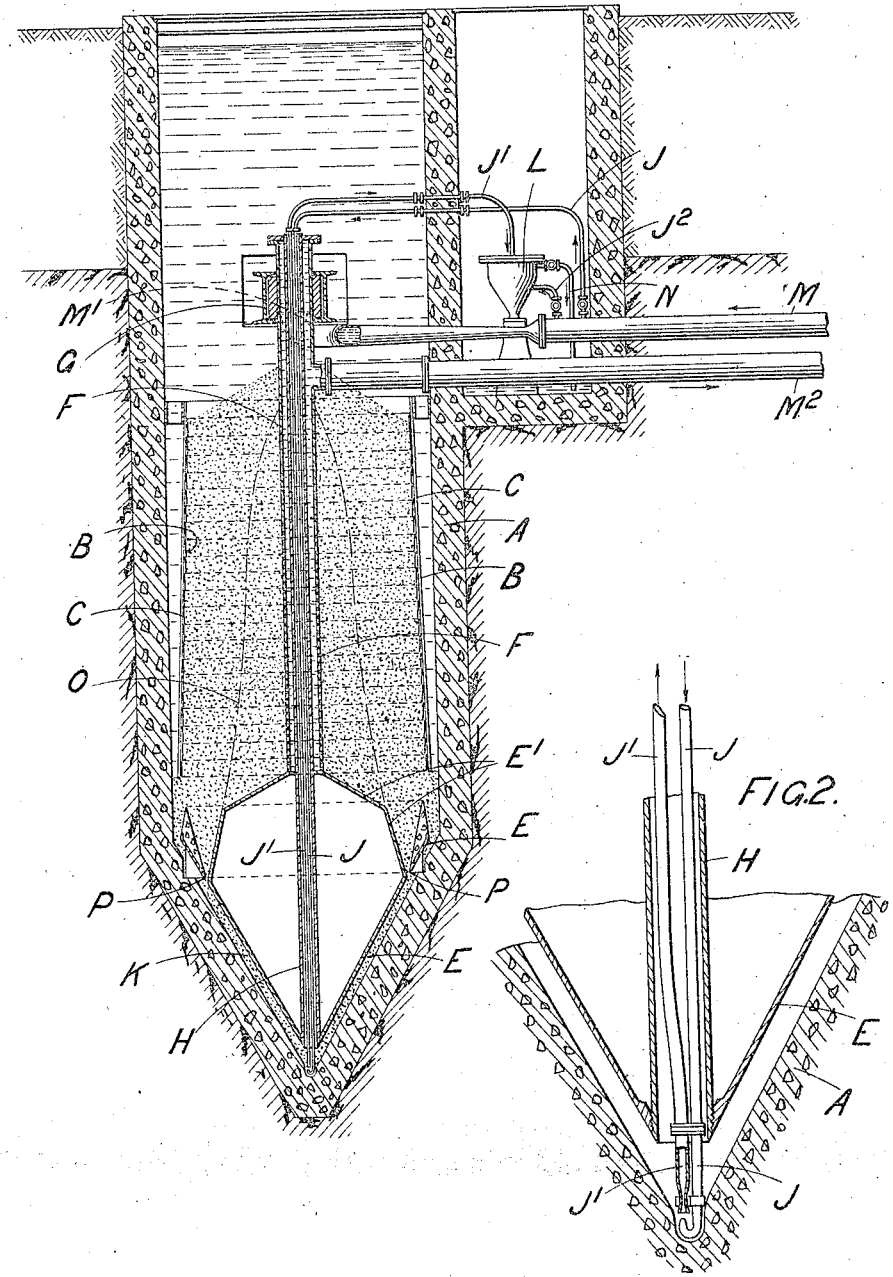
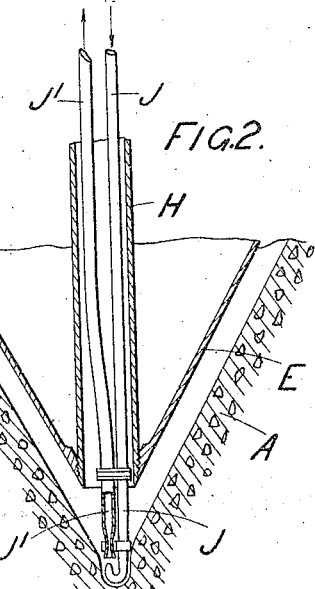

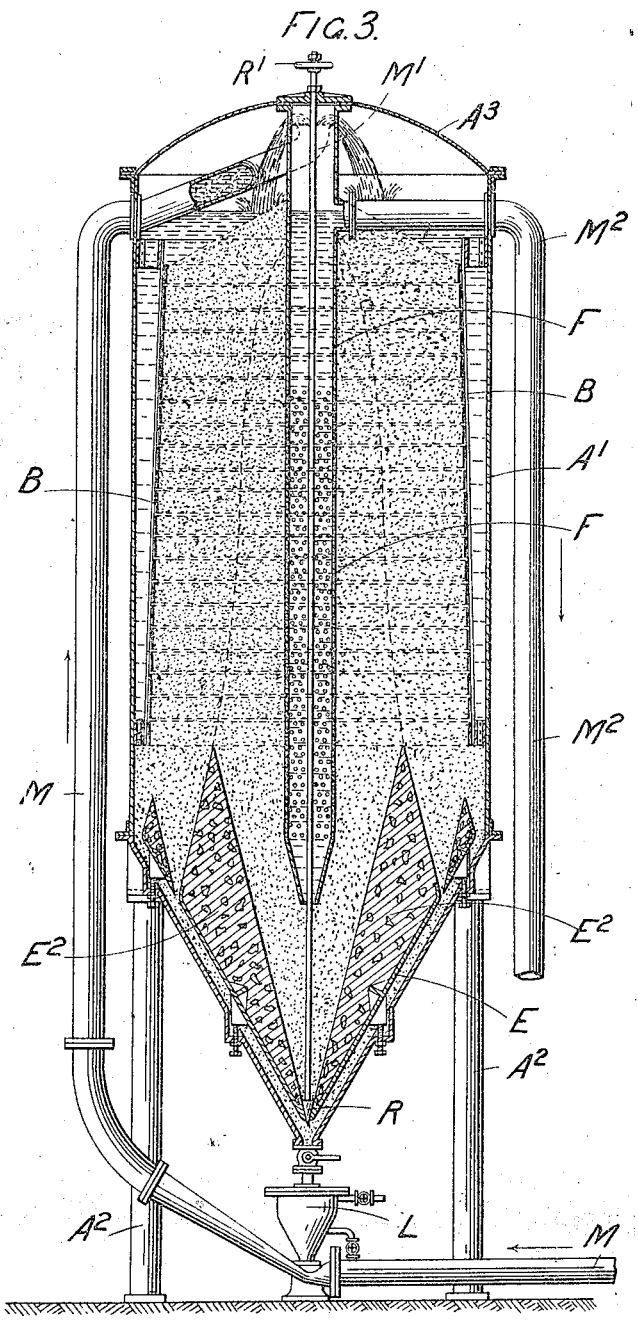

1,130,382.

Patented Mar. 2, 1915.
3 SHEETS—SHEET 3.

WITNESSES.
H. Albert R. Brown
Elizabeth Griffith

INVENTORS
Martin Deacon and
William Gore
By Church & Church
Their Attys.

UNITED STATES PATENT OFFICE.

MARTIN DEACON AND WILLIAM GORE, OF LONDON, ENGLAND.

FILTERING APPARATUS.

1,130,382.   Specification of Letters Patent.   Patented Mar. 2, 1915.

Application filed December 3, 1912. Serial No. 734,734.

*To all whom it may concern:*

Be it known that we, MARTIN DEACON and WILLIAM GORE, subjects of the King of England, residing at London, in England, have invented certain new and useful Improvements in Filtering Apparatus, of which the following is a specification.

This invention relates to filtering apparatus and has particular reference to an improved construction of filter of the kind in which the sand or other filtering medium is automatically transferred during the operation of the filter from one part of the filtering mass to another. In filters of this type the transference of the finely divided material conveniently takes place from the bottom to the top and it has been found that when this is the case there is formed within the containing vessel a cone of sand of considerable height which is practically stationary, the moving sand traveling by various paths through the annular space between the wall of the container and the boundary of the cone of stationary sand. Thus in addition to the filtering films which are formed on the top of the mass and throughout its depth a film will also be produced on the outside of the above mentioned cone, of comparatively stationary sand. It follows that the available area for filtering is largely increased and that the liquid to be filtered can with advantage be admitted not merely from the top of the apparatus but from other points in order to take full advantage of the film area.

The primary object of the present invention is the construction of a filter which shall utilize efficiently the area of the filtering films above mentioned.

The improved filter comprises a containing vessel having within it the mass of sand or other finely divided filtering material and preferably furnished with a hopper-like lower portion from which the sand is removed little by little, say by some form of ejector operated by the liquid under treatment. But instead of the liquid being admitted to the filtering mass only at the top as in the previous construction it is allowed to flow in from the sides. This is accomplished by providing the cylindrical container with a liner or internal cylinder or cylinders perforated or otherwise formed or disposed so as to allow the liquid to flow through it. This liner is of smaller diameter than the containing vessel and is supported by brackets or in some other convenient way within the container so as to leave an annular space between them down which the liquid to be filtered can pass.

Figure 4:
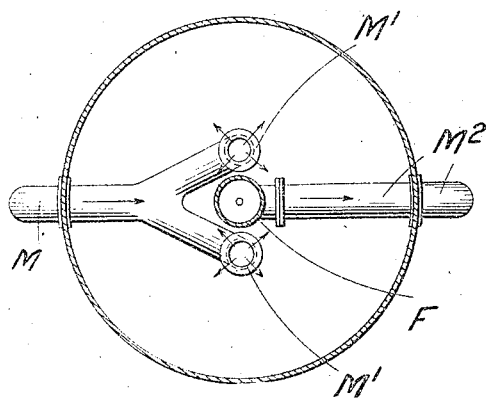
Figure 5:
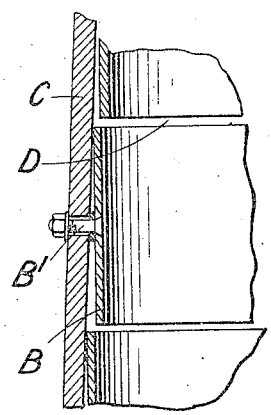
Figure 6:
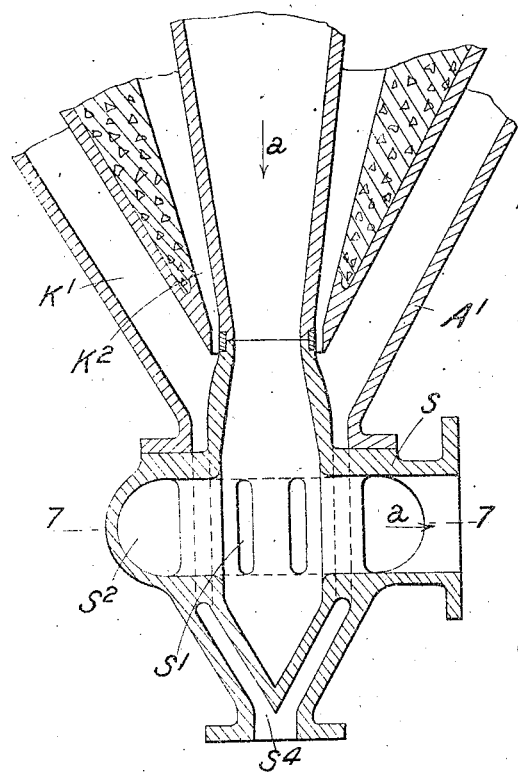
Figure 7:
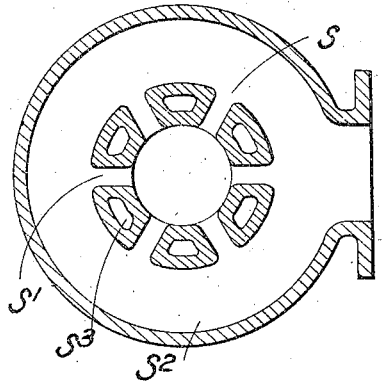

In the accompanying drawings Figure 1 is a vertical central section showing a construction of filter according to this invention adapted for use below the ground level. Fig. 2 shows the lower portion of Fig. 1 drawn to a larger scale. Fig. 3 is a view similar to Fig. 1 showing another form of filter also according to this invention adapted for use above the ground level. Fig. 4 is a plan of the construction shown in Fig. 3 with parts removed. Fig. 5 is a vertical section drawn to an enlarged scale showing a portion of the inner chamber or liner of the filters shown in Figs. 1 and 3. Fig. 6 is a vertical central section drawn to a larger scale and showing the lower part of another form of filter also according to this invention, and Fig. 7 is a transverse section on the line 7—7 of Fig. 6.

Like letters indicate like parts throughout the drawings.

With reference first to Figs. 1 and 2 this form of filter is adapted for use below the ground level and the outer wall of the container is in the form of a circular pit A of concrete or other suitable material. Within this pit is a liner formed of a series of short cylinders or rings B held by nuts and bolts B' (Fig. 5) to bars or frames C which are themselves supported in any convenient way within the circular pit A. The rings B decrease in diameter as they approach the top so that the whole liner is of slightly tapering form leaving an annular space between the inner wall of the pit A and the liner this annular space decreasing in width as the bottom of the pit is approached. A small space D (Fig. 5) is left between the bottom edge of one ring B and the top edge of the adjacent ring through which the liquid to be treated can pass from the annular space into the finely divided sand or other filtering medium within the liner.

The lower portion of the pit A is made of conical shape and is furnished with a hopperlike liner E closed by a top portion E' which forms, partially, the bottom of the filter proper, that is to say, it prevents the main body of the sand from falling down within the liner. The hopper E is supported from a central tube F hung from cross-girders G and perforated to allow the filtered liquid to pass into it after it has traversed the filtering material within the liner. Within this central tube F is another tube H extending right to the bottom of the hopper E and to the top of the tube F. Through this inner tube H run two small pipes J and J' which terminate at their lower extremities at the bottom of the conical point of the pit A. To this point travels the finely divided sand which has passed down through the space K between the hopper E and the conical wall of the pit A and the end of the pipe J is turned upwardly as shown in Fig. 2 so as to form, in conjunction with the lower open end of the pipe J', an ejector for causing small portions of the sand to travel up through the pipe J' to the washer L. The liquid to be filtered passes in through the main M, and the pipe J and also a pipe J² leading to the washer L are connected to the main. Some of the liquid passes through the pipe J to the bottom of the filter and then flows up through the pipe J' to the washer transferring the sand little by little. The clean sand from the washer L passes back to the main M through the hopperlike lower part of the washer and is carried by the stream of liquid into the top portion of the pit A where it falls on to the top of the mass of filtering material. There is sufficient head between the points where the pipe J and the washer L are connected to the main to insure the requisite flow. The pipe J² serves to supply clean liquid to the washer L to flow out with the clean sand and to displace the dirty washing liquid which, with any material removed from the washed sand passes away from the washer L through an outlet pipe N (Fig. 1). The pipe M is bifurcated shortly before it reaches the upper portion of the pipe F and each branch ends at an open mouth M'. No separate view of this is shown in the drawings but the arrangement is precisely similar to that shown in plan in Fig. 4, in connection with the modified construction of filter hereinafter described.

The broken line O in Fig. 1 indicates roughly the boundary between a central relatively stationary core of filtering material and the outer portion of the filtering mass which moves at a greater rate on its downward path through the apparatus. The line referred to may also be taken as indicating the surface of the filtering film which forms at or about the place indicated. It is not to be understood that one film only forms in this particular surface but the line is shown in the drawing as indicating diagrammatically that one or more films are formed in the general position shown. The primary object of the present invention is to use such film or films efficiently and it will be appreciated that the liquid under treatment passing into the filtering material through the spaces D between the rings B will take a course approximately normal to the surface of the films in question and will pass through them before it enters the perforated pipe F.

It is in order to assist the formation of films in the position indicated roughly by the line O that the bottom part of the filter is made as illustrated in Fig. 1 where it will be seen that there is no direct central path of flow for the material forming the central cone of sand. There is an outlet for the sand beneath the lower ring B and again at points marked P in Fig. 1 where there are slots or perforations in the upper part of the hopper E. Thus the main paths of flow of the filtering medium will be downward between the surface bounding the central comparatively stationary cone and the inner wall of the liner formed by the rings B. The filtered liquid from the pipe F passes upward and out through the main M².

The construction of filter shown in Fig. 3 is generally similar to that described with reference to Fig. 1 various modifications being introduced chiefly serving to make the filter suitable for use above the ground level. As will be seen by reference to Fig. 3 the outer casing or container is in the form of a cylindrical vessel A' supported on standards A² and containing within it a liner constructed of rings B which may be arranged as in Fig. 1. The bottom portion of the filter shown in Fig. 3 is modified the hopper E not being closed in as in the construction shown in Fig. 1 but formed with a partial filling of concrete or the like as at E². This is so shaped as to give a direct outlet for the central cone of filtering material but that outlet as may be seen by reference to the lower portion of Fig. 3 is closed by a valve R controlled by a hand wheel R' on the top of the apparatus. In this form of filter the main M bringing the liquid to be filtered is at the bottom of the apparatus as is also the washer L and the washed sand passes with the water to be filtered up to the main M out through the bifurcated ends M' of that main into the top of the filter which in this case is closed by a cover A³.

Fig. 4 is a plan of this construction of filter the open ends M' of the main M being clearly shown on each side of the pipe F. As in the construction previously described the filtered liquid passes into a central perforated pipe F whence it passes away through the main M².

The valve R can be regulated so as to control the opening at the bottom of the hopper E if it is desired to regulate the rate of travel of the filtering material in the central cone. In any case that rate of travel is slow and it may be practically stopped altogether by closing the opening entirely.

Fig. 6 shows in section the bottom portion of a modified construction of filter also according to this invention in which the filtered liquid instead of rising through a central pipe passes out in a direction indicated by the arrows $a$. In this construction which may be otherwise similar to the forms shown in Figs. 1 and 3 a casting S is provided beneath the conical bottom of the vessel A' and the filtered liquid passing down the central passage proceeds out through openings S' and an annular space $S^2$ to the main $M^2$. In this construction the sand coming down the passages K' $K^2$ would pass through apertures $S^3$ in the casting out through $S^4$ to the ejector and thence be carried to the washer.

What we claim as our invention and desire to secure by Letters Patent is:—

1. In a filter, the combination of an outer vessel or casing, an inner chamber or liner adapted to contain the filtering medium and having apertures or spaces in its periphery through which the liquid to be filtered can pass from the space between the outer vessel and the inner chamber into the mass of filtering material, a central perforated tube into which the filtered liquid can pass from the filtering medium, a second pipe within the perforated pipe, and means whereby the filtering medium may be transferred from the bottom of the outer vessel through said second pipe and returned to the top of the filtering mass.

2. In a filter the combination of an outer vessel or casing, an inner chamber or liner adapted to contain the filtering medium and having apertures or spaces in its periphery through which the liquid to be filtered can pass from the space between the outer vessel and the inner chamber into the mass of filtering material, a central perforated tube into which the filtered liquid can pass from the filtering medium, another pipe within the perforated pipe forming a conduit for two pipes J J' by means of which the filtering medium is transferred from the bottom of the outer vessel and returned to the top of the filtering mass.

In testimony whereof we have signed our names to this specification in the presence of two subscribing witnesses.

MARTIN DEACON.
WILLIAM GORE.

Witnesses:
 O. J. WORTH,
 C. P. LIDDON.